United States Patent [19]

Brothers

[11] Patent Number: 4,582,305

[45] Date of Patent: Apr. 15, 1986

[54] APPARATUS FOR CUTTING SHEET MATERIAL INTO PREDETERMINED SHAPES

[76] Inventor: Jack Brothers, 806 Tukedo Dr., Fort Walton Bch., Fla. 32548

[21] Appl. No.: 705,583

[22] Filed: Feb. 26, 1985

[51] Int. Cl.[4] .............................................. B25B 11/00
[52] U.S. Cl. ....................... 269/11; 269/21; 269/295; 269/307
[58] Field of Search ................. 269/21, 295, 302.1, 269/289 R, 307, 11; 51/235; 83/522, 565; 279/3

[56] References Cited

U.S. PATENT DOCUMENTS

| | | | |
|---|---|---|---|
| 2,417,149 | 3/1947 | Beaton | 269/11 |
| 2,629,924 | 3/1953 | Kauper | 269/11 |
| 3,588,079 | 6/1971 | Addy et al. | |
| 3,840,961 | 10/1974 | Brown | |
| 3,848,327 | 11/1974 | Gerber et al. | |
| 4,100,676 | 7/1978 | Ferguson | 269/295 |
| 4,116,426 | 9/1978 | Kessler | 269/307 |
| 4,475,458 | 10/1984 | Kennell et al. | 269/21 |

Primary Examiner—Robert C. Watson
Attorney, Agent, or Firm—Donald J. Singer; Richard J. Donahue

[57] ABSTRACT

Apparatus for holding and facilitating the cutting of translucent sheet material into predetermined shapes. A transparent plate is placed over a plenum formed by a support frame. A plurality of suction holes are formed through the plate having an enlarged diameter at the upper surface of the plate. Grooves are formed part way through the plate for guiding a cutting instrument. Alignment marks are provided on the surface of the plate for registering printed information on the material with the plate.

6 Claims, 6 Drawing Figures

4,582,305

APPARATUS FOR CUTTING SHEET MATERIAL INTO PREDETERMINED SHAPES

BACKGROUND OF THE INVENTION

The present invention concerns apparatus for holding and facilitating the cutting of translucent sheet material into predetermined sizes and shapes.

Many applications exist in which it is necessary to cut a roll or sheet of translucent material, such as some paper, into predetermined spatial sizes or shapes. One such application is found in the cutting of a roll of drawings of various sizes produced by a CAD/CAM (computer aided design/computer aided manufacturing) plotter, so that they can be used individually. Another application might involve the cutting of sheet material into a variety of nonlinear shapes, such as might be used for decorative or other purposes.

Presently known devices for cutting sheet material into predetermined shapes are quite complex and expensive to manufacture or lack the precision, simplicity of operation and other desireable features provided by the present invention and described later herein.

OBJECTS AND SUMMARY OF THE INVENTION

It is therefore the general object of the present invention to provide sheet material cutting apparatus of improved design and performance.

It is a further object of the present invention to provide a sheet material cutting device having means for backlighting, positioning and holding the material, while guiding an instrument for cutting the material into desired sizes and shapes.

The foregoing and other objects, features and advantages of the present invention will become apparent as the description thereof proceeds, when considered in connection with the accompanying illustrative drawings.

DETAILED DESCRIPTION OF THE INVENTION

Figure 1A:
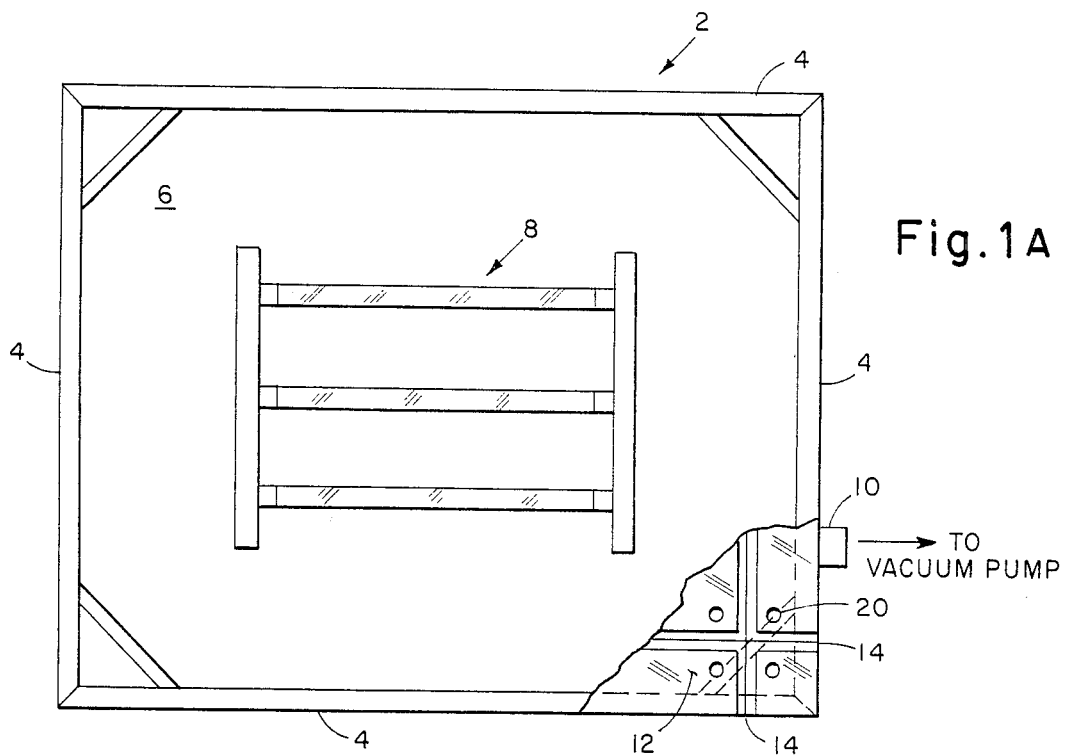
FIGS. 1A and 1B are top and side elevation views respectively of the support frame of the present invention, having a fragment of the cutting plate of the present invention positioned thereon.
Figure 1B:
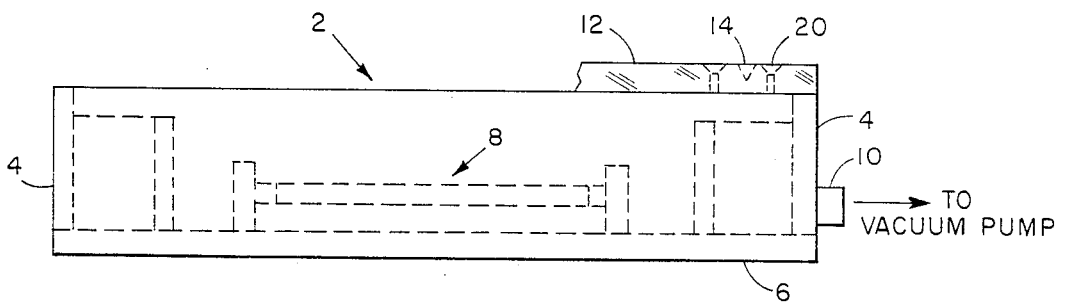

Referring now to FIGS. 1A and 1B of the drawings in greater detail, there is shown a support frame 2 comprising four upright side members 4 and a bottom member 6. Situated within the boxlike support frame 2 is a fluorescent light assembly 8. An exhaust port 10 protrudes from one of the side members 4 for connection of the plenum defined by the interior of the support structure 2 to a vacuum pump (not shown). A transparent (or translucent) cutting plate 12, a fragment of which is shown in FIGS. 1A and 1B, covers the top of support frame 2 and is backlighted by lighting assembly 8. Lighting assembly 8 is seen in FIG. 1A as being mounted on the upper surface of bottom member 6 and therefore within the plenum formed by the interior of the support frame 2. It can, however, if preferred, be contained in a cavity formed in bottom member 6, and be pneumatically isolated on the plenum area by sealing the cavity with a glass plate.

Figure 2A:
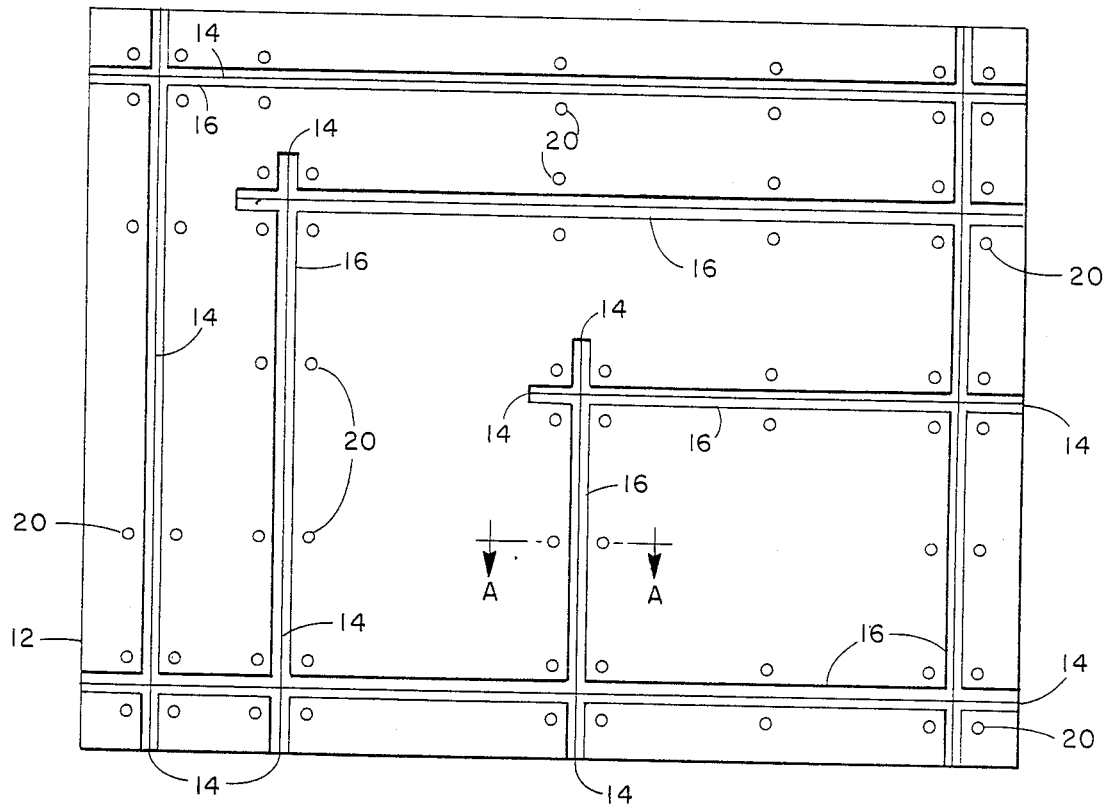
FIGS. 2A and 2B are top and side elevation views respectively of the cutting plate of the present invention.
Figure 2B:
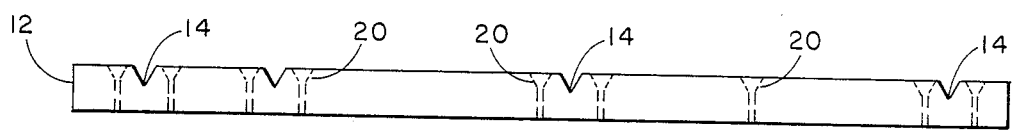

Referring now to FIGS. 2A and 2B of the drawings, the plate 12, which may be formed of a transparent or translucent material, is shown in greater detail. The upper surface of plate 12 has a number of V-shaped grooves 14 formed therein. The number and locations of the grooves 14 are such as to facilitate cutting of standard drawing sizes (e.g. B, C, D, E and F) from a plotted roll of paper. Only the grooves for three such drawing sizes are illustrated in FIG. 2A for the purpose of clarity. The drawings are cut to their correct margins or edges when the plotted drawing on the roll of paper is placed in alignment with inked, painted, or taped alignment lines 16 on the upper surface of cutting plate 12. The alignment lines 16 are of the proper dimensions to register with the printed border lines found approximately 0.5 inches within the outer edges of standard drawing size formats.

It will also be apparent that the cutting grooves which serve to guide a cutting instrument, may be nonlinear to accommodate an endless variety of shapes and sizes of patterns to be cut from a sheet or roll of translucent or transparent material.

In order that the sheet or roll of paper be held flat on the cutting plate during the cutting operation, suction holes 20 are drilled through plate 12 on each side of, and along each groove 14. Thus, when exhaust port 10 is connected to a vacuum pump, communication is provided between the underside of the paper placed atop plate 12 and the plenum chamber formed within the support frame 2. Atmospheric pressure then holds the sheet material during the cutting action.

Figure 3:
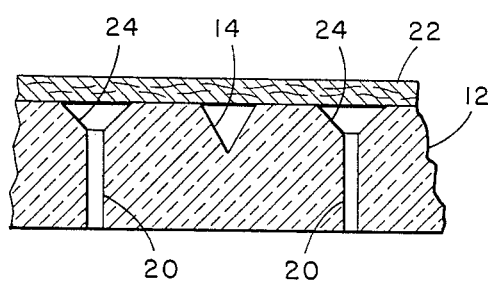
FIG. 3 is a view of the cutting plate taken through the line A—A of FIG. 2A.

FIG. 3 is a view taken through the line A—A in FIG. 2A. It illustrates the cross-section of a pair of holes 20 positioned on opposite sides of a groove 14, and a sheet of material 22 positioned on the upper surface of cutting plate 12. It will be seen in FIG. 3 that the holes 20 are countersunk to provide an enlarged diameter at the end 24 thereof which protrudes through the upper surface of plate 12. The maximum diameter at the upper surface of cutting plate 12 is made several times that of the basic hole, to present a holding area at least several times that of the hole 20 alone. In effect, the holding-down power of each hole is multipled reducing the capacity of the vacuum pump required to adequately hold the paper 24 to the cutting plate 12.

It will be apparent that the corner of the cutting instrument such as a razor blade, for example, doesn't actually do the cutting of the paper. It pierces the paper, rides in the groove and lets the nearby edge do the cutting, thereby retaining the sharpness of cutting capability longer than if the point (corner) did the cutting. The point actually will become dull in time and rides the groove better if a little dull, since it then has less of a tendency to climb out of the groove 14.

Figure 4:
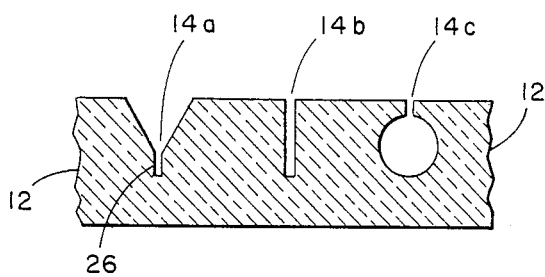
FIG. 4 is a sectional view of the cutting plate illustrating alternative embodiments of the cutter guide grooves used in the present invention.

A V-groove is not the only kind of groove envisioned in this invention. FIG. 4, for example, illustrates alternate forms of grooves 14a, 14b and 14c. Groove 14a, has a slot 26 with vertical walls formed at the vertex of the V-shaped cutter guide for further confining the sides of a cutting instrument.

Any number of cutting tools are envisioned, as long as they will ride in a groove 14 for control. Variations may include knives of many shapes as well as a rolling knife. A rolling blade has merit in that it has less of a tendency to climb out of the groove.

The cutting plate 12 may be attached to the support frame with suitable fasteners and gasket material may be provided therebetween. Although the suction holes 20 are shown only along the sides of each cutting groove, additional holes may be provided at other strategic locations on the plate 12 if they are needed. As previously mentioned the lighting assembly B may be sunken below the bottom member 6 and separated from the plenum chamber by a transparent window which additionally serves to seal the plenum from the outside atmosphere.

The provision of suction holes 20 on both sides of each cutting groove serve to hold the overlying paper firmly against the cutting plate 12, even after the cuts have been made. Even with the suction on, to remove cuttings or the now-separated drawing, one need only peel back the material by lifting an edge or corner.

Although the fluorescent light assembly 8 is shown in to be smaller than the bottom member 6, full length lights might be more suitable in certain applications.

Although the invention has been described with reference to a particular embodiment, it will be understood to those skilled in the art that the invention is capable of a variety of alternative embodiments within the spirit and scope of the appended claims.

What is claimed is:

1. Apparatus for holding and facilitating the cutting of translucent sheet material into predetermined shapes comprising:

a boxlike support frame comprised of four upright side members and a bottom member;

a transparent cutting plate positioned atop the edges of said side members and coextensive with the rectangular area defined by said side members;

cutter guide grooves formed on the upper surface of said cutting plate, said grooves extending only part way through the thickness of said cutting plate;

a plurality of holes extending through said cutting plate;

said holes being enlarged at said upper surface of said cutting plate;

lighting means disposed below said cutting plate for backlighting said cutting plate; and means for establishing a vacuum in the plenum formed by said support frame and said cutting plate.

2. Apparatus as defined in claim 1 and further comprising material alignment marks formed on said upper surface of said cutting plate.

3. Apparatus as defined in claim 2 wherein said plurality of holes are positioned on both sides of said cutter guide grooves.

4. Apparatus as defined in claim 3 wherein said plurality of holes are countersunk on said upper surface of said cutting plate so as to at least double the surface diameter of said holes.

5. Apparatus as defined in claim 4 wherein said cutter guide grooves have a V-shaped cross section.

6. Apparatus as defined in claim 5 wherein each of said V-shaped cutter guide grooves has a slot at the vertex thereof for further confining the sides of a cutting instrument.

* * * * *